United States Patent [19]

Henning et al.

[11] 4,305,416

[45] Dec. 15, 1981

[54] FUEL TANK FOR AUTOMOBILES

[75] Inventors: Bodo Henning; Heinz Beckmann, both of Brunswick; Rolf Reinke, Lehre, all of Fed. Rep. of Germany

[73] Assignee: Volkswagenwerk Aktiengesellschaft, Wolfsburg, Fed. Rep. of Germany

[21] Appl. No.: 175,900

[22] Filed: Aug. 6, 1980

[30] Foreign Application Priority Data

Aug. 9, 1979 [DE] Fed. Rep. of Germany ....... 2936318

[51] Int. Cl.³ ............................................. B65D 87/44
[52] U.S. Cl. ..................................... 137/38; 137/264; 137/576; 137/590; 220/20.5
[58] Field of Search ..................... 137/38, 44, 264, 265, 137/576, 590; 220/20.5, 23.83; 280/5 A

[56] References Cited

U.S. PATENT DOCUMENTS 4,178,955 12/1979 Dau ..................................... 137/264

FOREIGN PATENT DOCUMENTS 2552208 2/1977 Fed. Rep. of Germany .
2723771 7/1978 Fed. Rep. of Germany .
2727497 4/1979 Fed. Rep. of Germany .
2817303 10/1979 Fed. Rep. of Germany ...... 137/590
2391935 12/1978 France ............................. 137/590

Primary Examiner—Robert G. Nilson
Attorney, Agent, or Firm—Brumbaugh, Graves, Donohue & Raymond

[57] ABSTRACT

A tank for automobile fuel, having a back-up tank contained therein to maintain a minimum fuel level about the opening of the fuel suction line during vehicle acceleration conditions, has a back-up tank assembly and related components, such as a filter, a pump and guide walls forming funnels, all of which can be inserted and secured in the tank through an opening therein after fabrication and installation of the tank.

8 Claims, 2 Drawing Figures

FUEL TANK FOR AUTOMOBILES

BACKGROUND OF THE INVENTION

This invention relates to a tank for liquids subjected to acceleration forces, such as those used for fuel tanks in automobiles. A fuel tank for automobiles constructed in this manner is disclosed in German Letters of Disclosure No. 25 52 208.

The prior art teaches that the purpose of a back-up tank is to retain a sufficient quantity of liquid in the zone of the opening of the suction line, even when the liquid level in the tank is relatively low, or, when the tank is subjected to acceleration forces, such as those which act upon a fuel tank during extended turning, which tend to force the liquid away from the opening of the suction line. Should fuel not be present at the opening when the engine is operating, the pump will draw air and go into cavitation.

Suitably, the back-up tank of the kind disclosed in German Letters of Disclosure No. 27 23 771, can also be utilized for mounting a fluid pump and a fluid strainer.

SUMMARY OF THE INVENTION

It is the purpose of the invention to create a tank, of the kind mentioned above, wherein the assembly of the back-up tank, in addition to relatively large guide walls situated on the bottom of the tank, is especially simple, regardless of whether the tank is a one-piece or multi-part container and regardless of the material of which it is fabricated.

For the purpose of clarification of the inherent problems in existing tanks, it is instructive to consider the preferred embodiment of the invention, namely, as a fuel tank in an automobile. Currently available fuel tanks for automobile applications consist of sheet metal in two parts, which are tightly joined by welding. In this type of tank, it is possible to introduce the back-up tank into the bottom part of the tank before the upper part of the tank is added, provided that the back-up tank is composed of a material that can be welded to the sheet metal. However, disassembly of at least the essential components of the back-up tank after fabrication of the tank is of great interest, since accessability to the back-up tank is considerably restricted, at best, due to the welded connections between the upper and the lower portions of tank. For example, there is a need for at least partial disassembly of the back-up tank where it also serves as a support for a fuel pump and such pump has to be exchanged, or whenever a back-up tank-located fluid strainer needs to be replaced. Where flaps are provided in the back-up tank for the purpose of covering the admission or intake ports, to prevent outflow of fuel when acceleration forces are applied to the tank, it may also become necessary to repair them, at least in the area of their suspension.

Most recently, the problem of fixing the back-up tank, when positioned on the bottom of the tank, has become even more difficult in that fuel tanks are now fabricated from synthetic materials and the tanks are produced in one piece, e.g., by a blow molding process. Aside from the fact that for this type of construction, the fuel tank is accessible only through a limited upper opening, the back-up tank must then also consist of a synthetic material, at least on the bottom, so that it can be welded to the tank bottom. Therefore, there is need for a construction which, while retaining the essential parts of the back-up tank, makes it possible to use them in tanks which are composed of various materials, in particular sheet metal and plastics.

Thus, it is the special purpose of the invention to create a tank which permits the assembly and disassembly of at least the essential components of the back-up tank, independent of the material of the tank and also regardless of whether the tank is composed of several parts or of one piece having a top opening. A primary advantage of the invention is that independent of the material and the construction of the tank concerned, i.e., in the preferred embodiment of a fuel tank, the back-up tank can be adapted to be assembled and disassembled and the choice of the material for the back-up tank is important only in the zone of a fixing ring, a ring that affixes the back-up tank to the main tank. The connection between the back-up tank and the fixing ring, which is engaged and disengaged by rotation of the back-up tank, is secured merely by means of an anti-rotation safety latch which is formed by the projection of parts of guide walls into vertically-oriented openings in the fixing ring which are, in effect, extensions of the grooves in the back-up tank (when the back-up tank and the fixing ring are properly mated).

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENT

Figure 1:
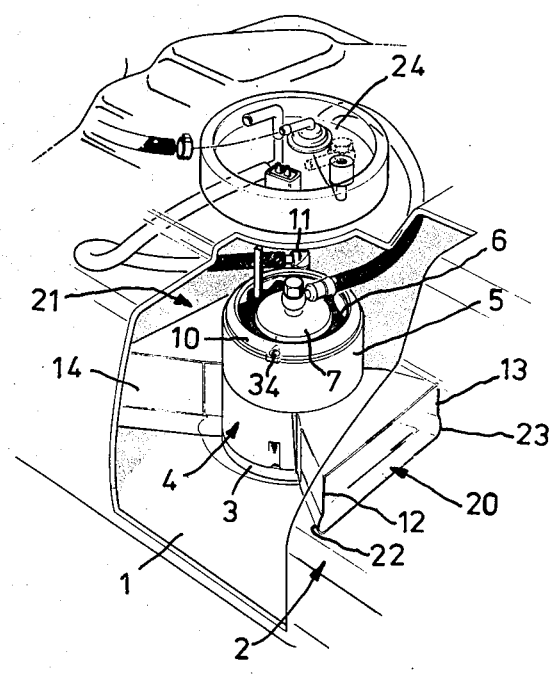
FIG. 1 is a partial perspective view of the tank assembly.

Viewing initially the major components of the arrangement illustrated in FIG. 1, it can be seen that the back-up tank 4 is held by means of a fixing ring 3, which is welded to the bottom 1 of the tank 2. On the back-up tank 4, a top 5 is set, which by way of an elastic intermediate layer 6, holds a fluid pump 7.

The embodiment shown deals with a fuel tank for an automobile and therefore the pump 7 is adapted to handle fuel. Its downwardly directed suction opening projects into a fuel filter 8 (see FIG. 2) which, in turn, projects into the space enclosed by the back-up tank 4. In a manner known in this art, the back-up tank 4 is provided with several admission or intake ports as well as flaps 9 associated therewith. When acceleration forces occur, which cause the volume of fuel within the back-up tank 4 to move in the direction towards an intake port, the port is closed by a flap, thus preventing the fuel from leaving the back-up tank 4.

A closing ring 10 provides the upper closure of the back-up tank and the upper closure of the arrangement formed by the back-up tank and the top 5, as well. By way of a plug or snap connection, the closing ring 10 supports a connecting sleeve 11 for a fuel return line.

From the back-up tank, pairs of guide walls 12, 13 and 14, 15, respectively, radiate outwardly, which also extend perpendicularly to the bottom 1 of the tank 2 and are complemented so as to form funnels 20 and 21 by means of upper and lower cross walls 16, 17 and 18, 19, respectively. For reasons of tolerance, the funnels 20 and 21 have flexible lower edge regions 22 and 23 (i.e., for funnel 20) which in this case are fabricated by hollowing-out or making the walls concave as shown and by decreasing the wall thicknesses.

The figures show that the back-up tank 4 is placed below the upper opening 24 of the tank 2, so that assembly can take place from above.

In the following explanation, reference is made essentially to FIG. 2, since this exploded view shows the necessary means to produce the connections between the various components of the insert containing the back-up tank 4.

A first important component is the aforementioned fixing ring 3, which is fabricated from a material that can be welded to the bottom 1 of the tank 2; i.e., in the case of a fuel tank 2 of a blowable plastic, the back-up tank is likewise of plastic. In order to obtain sufficient stiffness of the fixing ring 3, it is helpful to provide a metal reinforcement for the fixing ring, e.g., in the form of an insert.

Figure 2:
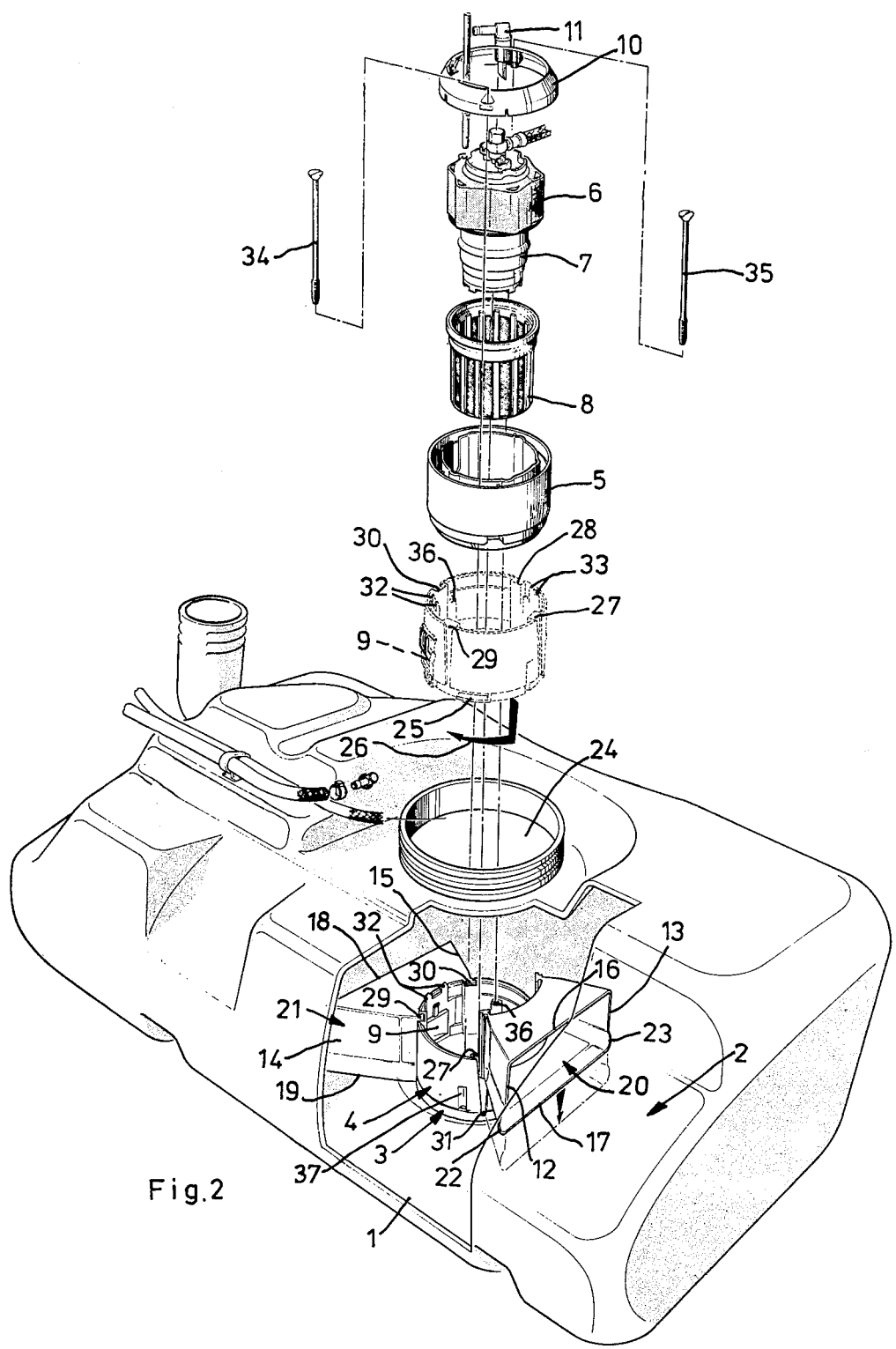
FIG. 2 is an exploded view of the tank assembly.

FIG. 2 illustrates, by a broken line, the state prior to assembly, from which it becomes apparent that the back-up tank 4 is provided with hook-like projections 25, for the formation of a bayonet closing, which are introduced into the corresponding receptacle on the fixing ring 3 by rotation in the direction of the arrow 26. Such an assembly is easily possible even though the opening 24 in the tank 2 is small with respect to the dimensions of the back-up tank 4. Obviously, a prerequisite for such an assembly is that the diameter of the back-up tank 4 be smaller than the diameter of the opening 24.

In this embodiment, the back-up tank 4 is also provided with four grooves 27 through 30 which have a dovetail-like cross section and in which, in the assembled condition, engage with corresponding web-like continuations of the guide walls 12 through 15. The lower part of FIG. 2 shows that the width of the grooves 27 through 30 increases in the upward direction such that, as illustrated for the funnel 20, the funnels 20 and 21 can be easily inserted from above, after elements 3 and 4 are connected. Accordingly, the dimensions of the funnels must be likewise adjusted to the inner diameter of the opening 24.

Following assembly, parts of the guide walls 12 through 15 will project, as shown, for example, for the guide wall 12, into openings or clearances 31 in the fixing ring 3, so that the back-up tank 4 is secured against undesirable rotation relative to the fixing ring 3, therefore preventing accidental disengagement of this connection.

In the area of its upper edge, the back-up tank 4 is provided with spring hooks 32 and 33 which, together with corresponding receptacles on the top 5, form a snap or clip connection therefor. Accordingly, the top 5 is seated from above, i.e., through the opening 24 in the tank 2, following insertion of the funnels 20 and 21. Thereafter, the fuel filter 8 and the pump 7—the latter including the elastic collar 6—are set into the top 5. However, it is also possible to assemble parts 5 through 8 outside the tank 2 and to insert them as a unit on the back-up tank 4. The entire assembly is capped by the closing ring 10 which is held on the top 5 by means of plug or clip connectors (not shown).

Thus, an important aspect of the invention is the ability to assemble all of the elements of the back-up tank and insert this assembly into the tank 2 through the opening 24.

It is also possible to secure the insert assembly (all elements except the back-up tank 4) within the back-up tank 4 by screws. Such screws, specifically shown in FIG. 2 at 34 and 35, are threaded into bosses, which are shown in FIG. 2 at 36 and 37, provided in the back-up tank 4, and secure all parts of the insert relative to one another.

The foregoing description of the figures indicates that the insert assembly and the back-up tank 4 can be used regardless of whether the tank 2 is composed of one or more pieces. Adaptation to the material of the particular tank utilized can be easily achieved by exchanging the fixing ring 3. Whereas the material of the ring will be the same as the material of the tank (e.g., sheet metal, polyethylene), the components of the insert, and in particular the back-up tank, should be composed of a material which is rigid even as small wall thicknesses, such as polyamide or polyacetal, which, incidentally, also permits easier production of complex parts. In the event that the back-up tank 4 itself is not designed for a snug engagement with the tank bottom 1, its connection with the fixing ring 3 and the ring's connection with the tank bottom 1 must be effected tightly.

Due to the possibility of assembly of the guide walls in the tank, provided for in accordance with the invention, a relatively large insert composed of the back-up tank and the guide walls can be accommodated in the tank 2 through the opening 24.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

We claim:

1. In a tank for a liquid subjected to acceleration forces, such as a fuel tank for automobiles, having an opening therein and a back-up tank affixed to the bottom of said tank, said back-up tank surrounding the opening of a suction line for said liquid, said back-up tank being provided with admission ports, flap means which, on occurrence of acceleration forces, automatically prevents outflow of said liquid through said admission ports, and guide walls for said liquid extending upwardly from the bottom of said tank, said guide walls being arranged radiating outward from said back-up tank; the improvement wherein the diameter of said back-up tank is smaller than the inner diameter of said opening, a fixing ring is welded to said bottom of said tank, said fixing ring fixes the back-up tank to the bottom of said tank by a connection which can be engaged and disengaged by rotating said back-up tank, dovetail-like groove means extend upwardly from the bottom of said back-up tank and interconnect the back-up tank and the guide walls, and at least one of said guide walls projects into a vertically oriented opening in said fixing ring for the purpose of forming a safety latch against rotation of said back-up tank.

2. In a tank as set forth in claim 1, the further improvement wherein said fixing ring is fabricated from weldable synthetic material and is provided with stiffening means, and said back-up tank is fabricated from synthetic material sufficiently rigid to provide stability of shape even for small wall thicknesses.

3. In a tank as set forth in claim 1 or 2, the further improvement wherein said back-up tank has a top carried thereon by a plug-like connection, a pot-shaped fluid strainer being supported from said top, and projecting into said back-up tank, said top holding a pump for the liquid in the tank, an elastic collar interposed between said top and said pump, said pump having a suction opening forming the opening of a suction line for the tank and said opening being surrounded by said strainer.

4. In a tank as set forth in claim 3, the further improvement wherein a further plug-like connection connects a closing ring to said top, said closing ring having a connecting sleeve, said sleeve being adapted for connection to a return liquid line.

5. In a tank as set forth in claim 4, the further improvement wherein said closing ring is secured to said back-up tank by at least one screw extending substantially perpendicularly to said bottom of said tank.

6. In a tank as set forth in claim 1, the further improvement wherein said guide walls have a region that is flexible in the direction perpendicular to said bottom of said tank.

7. In a tank as set forth in claim 6, the improvement wherein two of said guide walls are joined by upper and lower cross walls to form a funnel, said funnel having a zone proximate its bottom edges wherein at least portions of walls are made concave to form said yielding regions.

8. In a tank as set forth in claims 6 or 7, the improvement wherein two of said guide walls are joined by upper and lower cross walls for a funnel, said funnel having a zone proximate its bottom edges wherein at least portions of walls are made with a decreased wall thickness to form said yielding regions.

* * * * *